United States Patent
Herman et al.

(10) Patent No.: US 10,906,425 B2
(45) Date of Patent: Feb. 2, 2021

(54) SYSTEMS AND METHODS TO GENERATE CHARGING WARNINGS

(71) Applicant: Ford Global Technologies, LLC, Dearborn, MI (US)

(72) Inventors: David Michael Herman, Southfield, MI (US); Nicholas Scheufler, Flat Rock, MI (US); David A. Herman, Southfield, MI (US); Nunzio DeCia, Northville, MI (US); David Joseph Orris, Southgate, MI (US); Stephen Jay Orris, Jr., New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 15/946,241

(22) Filed: Apr. 5, 2018

(65) Prior Publication Data

US 2019/0308509 A1 Oct. 10, 2019

(51) Int. Cl.
*B60L 53/66* (2019.01)
*B60L 53/35* (2019.01)
*B60L 58/12* (2019.01)

(52) U.S. Cl.
CPC .......... *B60L 53/665* (2019.02); *B60L 53/35* (2019.02); *B60L 58/12* (2019.02); *B60L 2240/72* (2013.01)

(58) Field of Classification Search
CPC ........ B60L 53/665; B60L 53/35; B60L 58/12; B60L 3/00; B60L 3/0046; B60L 58/15; B60L 2240/72
See application file for complete search history.

(56) References Cited

U.S. PATENT DOCUMENTS

| | | | |
|---|---|---|---|
| 8,063,605 B2* | 11/2011 | Tonegawa | B60L 53/305 320/107 |
| 8,527,129 B2 | 9/2013 | Atluri et al. | |
| 8,838,385 B2 | 9/2014 | Van Wiemeersch | |
| 8,849,742 B2 | 9/2014 | Lovett et al. | |
| 9,153,966 B2* | 10/2015 | Ishida | B60L 53/305 |
| 10,245,968 B2* | 4/2019 | O'Connell | H02J 3/008 |
| 2009/0066287 A1* | 3/2009 | Pollack | G06Q 50/00 320/101 |
| 2011/0076104 A1* | 3/2011 | Ersoy | B65G 51/24 406/34 |
| 2011/0084664 A1* | 4/2011 | White | B60L 53/65 320/134 |
| 2012/0215348 A1* | 8/2012 | Skrinde | B25J 11/0085 700/245 |

(Continued)

FOREIGN PATENT DOCUMENTS

CN 103532975 B * 8/2016

*Primary Examiner* — Hunter B Lonsberry
*Assistant Examiner* — Daniel L Greene
(74) *Attorney, Agent, or Firm* — David Kelley; Brooks Kushman, P.C.

(57) ABSTRACT

A network of electric vehicle chargers is provided. The network may include a controller that, responsive to data indicating a threshold risk of utility grid power loss in a defined geographic area, broadcasts commands summoning vehicles in the defined geographic area to travel to and charge via the network, and prioritize charging of the vehicles at the network according to charge state data such that the vehicles having lowest state of charge are charged first.

16 Claims, 6 Drawing Sheets

(56) References Cited

U.S. PATENT DOCUMENTS

| | | | | |
|---|---|---|---|---|
| 2012/0296479 | A1* | 11/2012 | Millar | F24D 19/1048 |
| | | | | 700/277 |
| 2013/0041705 | A1* | 2/2013 | Hampapur | G06Q 10/10 |
| | | | | 705/7.12 |
| 2013/0088093 | A1* | 4/2013 | Aschenbroich | B60L 53/65 |
| | | | | 307/112 |
| 2014/0125279 | A1* | 5/2014 | Juhasz | B60L 53/305 |
| | | | | 320/109 |
| 2014/0281645 | A1* | 9/2014 | Sen | H02J 3/32 |
| | | | | 713/340 |
| 2015/0130630 | A1* | 5/2015 | Outwater | G06Q 30/06 |
| | | | | 340/870.02 |
| 2015/0298565 | A1* | 10/2015 | Iwamura | B60L 58/14 |
| | | | | 701/22 |
| 2016/0193932 | A1* | 7/2016 | Vaghefinazari | B60L 53/67 |
| | | | | 320/109 |
| 2016/0359707 | A1* | 12/2016 | Martin | H04L 5/006 |
| 2017/0070062 | A1* | 3/2017 | Qureshi | H02J 7/00712 |
| 2017/0123421 | A1* | 5/2017 | Kentley | G01S 17/87 |
| 2017/0227596 | A1* | 8/2017 | Sozer | G01M 5/0058 |
| 2018/0188051 | A1* | 7/2018 | Gaspard-Boulinc | |
| | | | | G01C 21/3469 |
| 2019/0028904 | A1* | 1/2019 | Carpenter | G08G 5/0091 |
| 2019/0039470 | A1* | 2/2019 | Moghe | G08G 1/096783 |
| 2019/0241093 | A1* | 8/2019 | Shimauchi | B60L 53/16 |
| 2019/0308509 | A1* | 10/2019 | Herman | B60L 53/66 |

\* cited by examiner

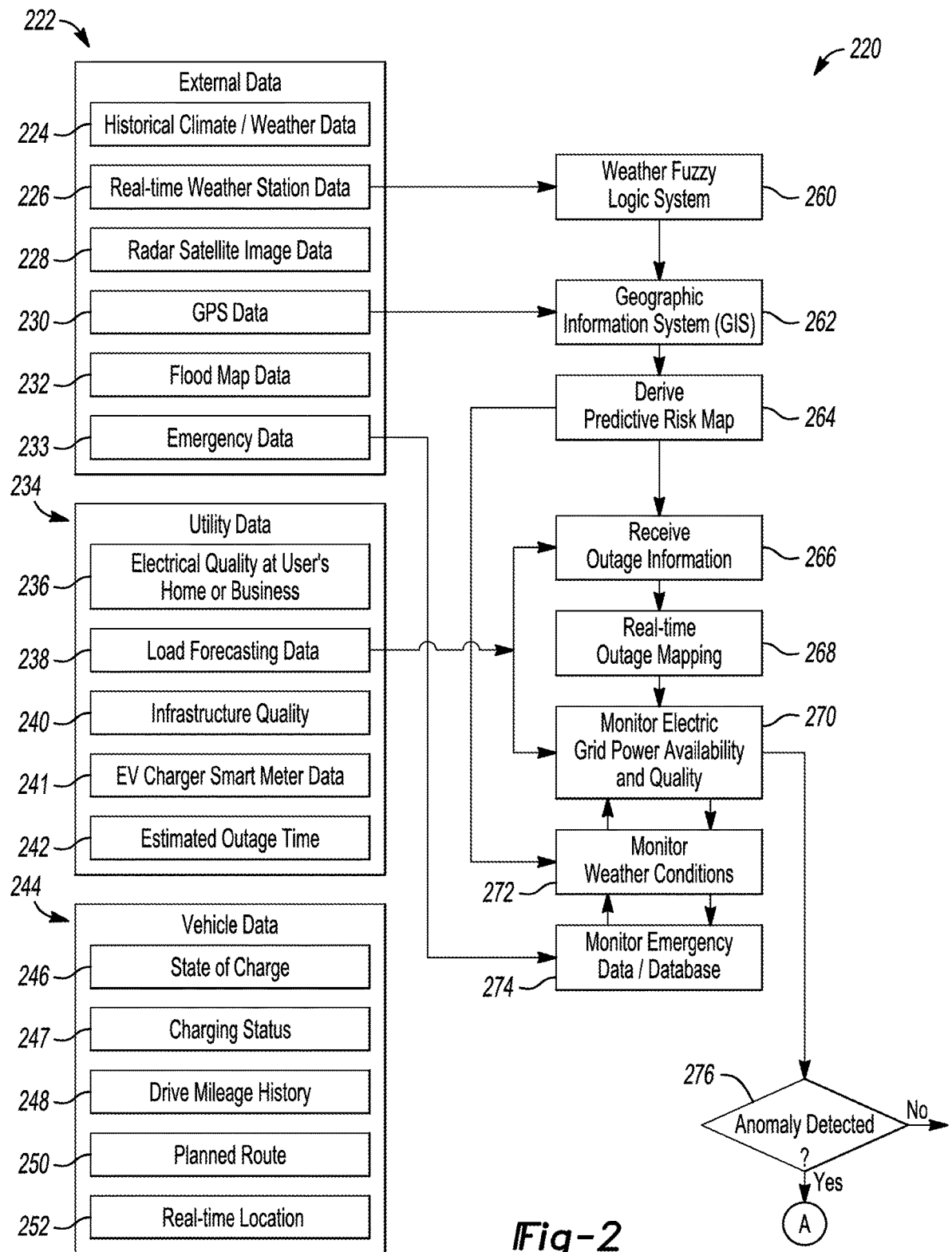

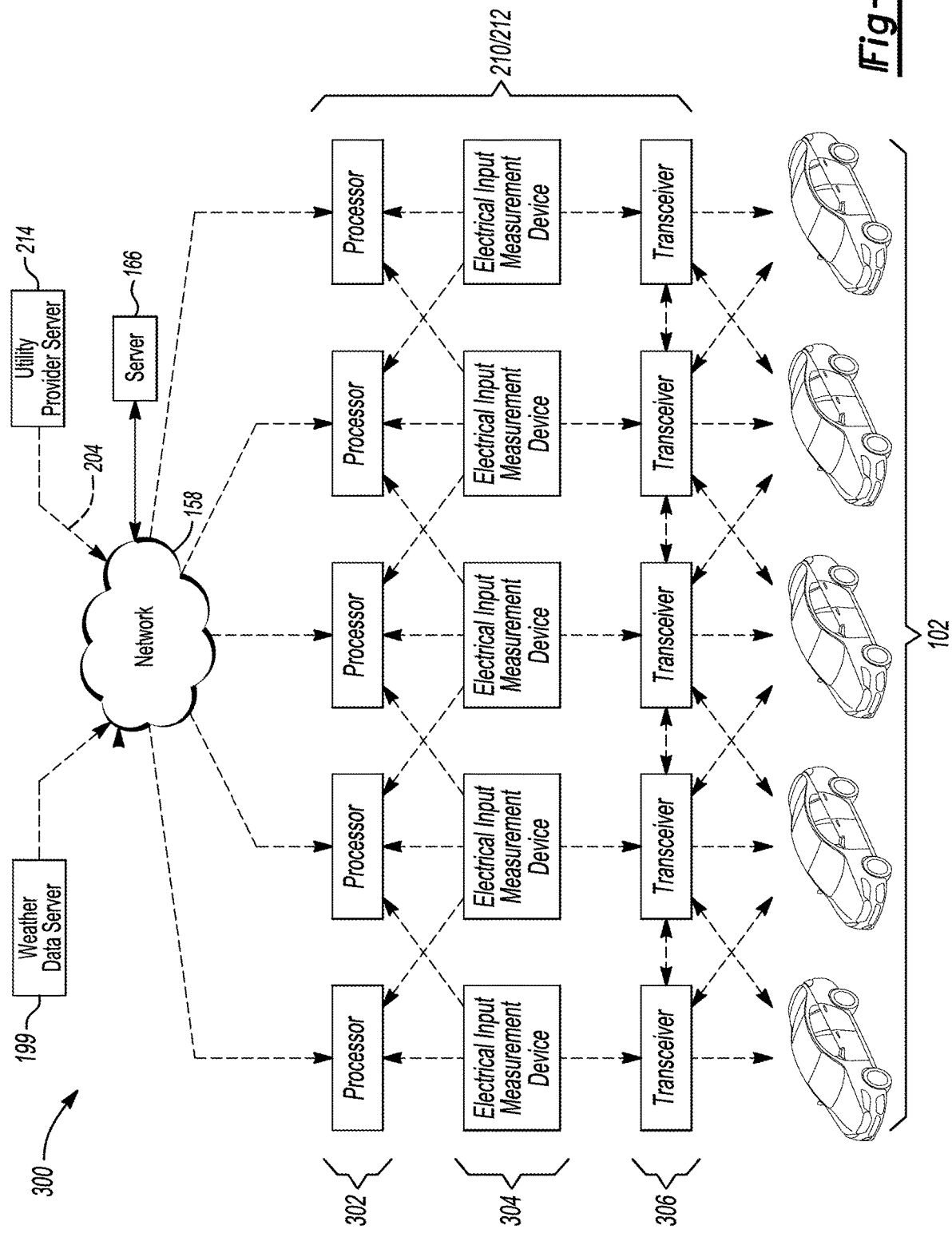

SYSTEMS AND METHODS TO GENERATE CHARGING WARNINGS

TECHNICAL FIELD

The present disclosure relates to systems and methods to generate charging warnings.

BACKGROUND

While sales of battery electric vehicles (BEVs) and hybrid vehicles (HEVs) have increased over recent years, range anxiety poses a potential barrier for broad acceptance of BEVs and HEVs. Range anxiety refers to the apprehension associated with draining the battery of the BEV or HEV and not having the ability to readily recharge. The limited range per charge and the lack of charging infrastructure contribute to people's perceptions of BEVs. An increase in extreme weather has contributed to an increase in electrical blackouts, further compounding the range anxiety issue.

SUMMARY

According to one embodiment of this disclosure, a network of electric vehicle chargers is provided. The network may include a controller configured to, responsive to data indicating a threshold risk of utility grid power loss in a defined geographic area, broadcast commands summoning vehicles in the defined geographic area to travel to and charge via the network, and prioritize charging of the vehicles at the network according to charge state data such that the vehicles having lowest state of charge are charged first.

According to another embodiment of this disclosure, a method of operating a network of electric vehicle chargers is provided. The method may include broadcasting commands summoning vehicles in a defined geographic area to travel to and charge via the network, responsive to data indicating a threshold risk of utility grid power loss in the defined geographic area. The method may also include prioritizing charging of the vehicles at the network according to charge state data such that the vehicles having lowest state of charge are charged first.

According to yet another embodiment of this disclosure, a network is provided. The network may include an Internet-of-Things (IOT) device, electrically connected to a utility grid, in communication with a vehicle, and located at a base location of the vehicle. The method may also include a plurality of electric vehicle chargers each having a controller configured to, responsive to receiving data indicating power loss of the utility grid from the IOT device via the vehicle, broadcast commands summoning the vehicle to and charge via the network.

BRIEF DESCRIPTION OF THE DRAWINGS

FIG. 3 is a schematic diagram of an example charger-based network according to another embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
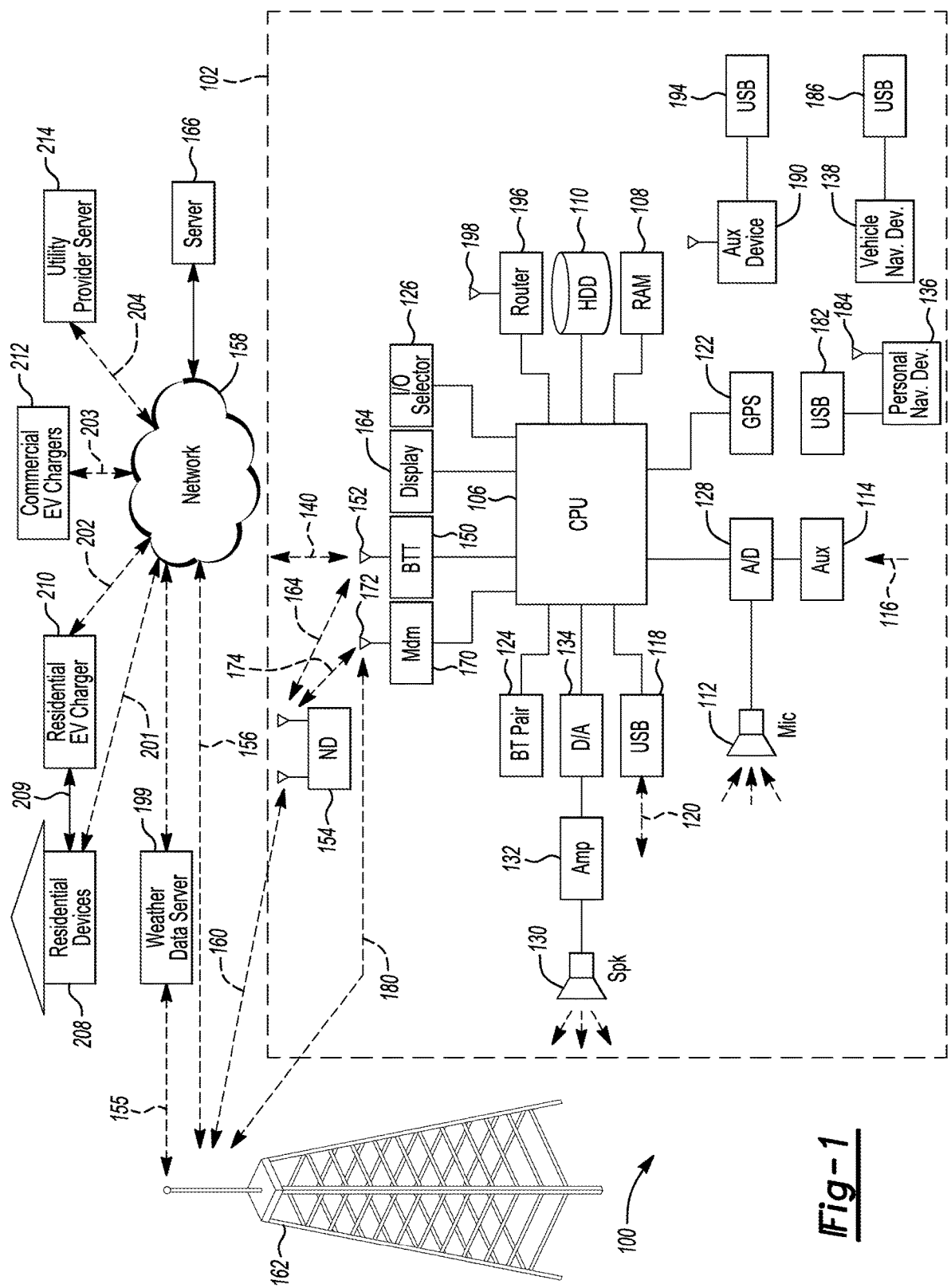
FIG. 1 is a schematic diagram of an example vehicle-based computing system according to at least on embodiment of this disclosure.

FIG. 1 illustrates an example block topology for a vehicle-based computing system 100 (VCS) for a vehicle 102 of a vehicle sharing system according to a representative embodiment. As will be described in greater detail below, a charger-based computing system and network 300 may be used. An example of such a vehicle-based computing system and network 100 is the SYNC system manufactured by THE FORD MOTOR COMPANY. A vehicle enabled with a vehicle-based computing system may contain a visual front-end interface 104 located in the vehicle. One or more users may be able to interact with interface 104, for example, using a touch sensitive screen. In another illustrative embodiment, the interaction occurs through button presses or spoken dialog processed by automatic speech recognition and speech synthesis systems, or through a connected personal device.

In the illustrative embodiment shown in FIG. 1, a processor 106 controls at least some portion of the operation of the vehicle-based computing system. Provided within the vehicle, the processor allows onboard processing of commands and routines. As described in greater detail below with reference to FIG. 2, processor 106 may perform various algorithms or functions associated with providing an alert or warning to a vehicle or charger associated with a vehicle within a particular geographic area or a vehicle that is likely to be in a certain geographic area. The geographic area may be one or more regions that have been predicted to experience a power outage, or flooding, wild fires, hurricanes, etc. The geographic area may also be an area that is experiencing a power outage. Further, the processor is connected to various types of non-transitory or tangible computer program products or storage media implementing both temporary or non-persistent storage 108 and persistent storage 110. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory.

The processor is also provided with a number of different inputs and outputs to facilitate user interaction with the processor and related devices. In this illustrative embodiment, a microphone 112, an auxiliary input 114 (for input 116), a USB interface 118 (for input/output 120), a GPS input 122, display screen 104, which may be a touchscreen display, and a BLUETOOTH pairing interface 124 are all provided. An input/output (I/O) selector 126 may be provided to facilitate user selection of a particular input/output for use. Input to both microphone 112 and auxiliary interface 114 may be converted from analog to digital signals by an associated A/D converter 128 before being communicated to the processor 106. Although not explicitly illustrated, vehicle components and auxiliary components in communication with the VCS may use a wired or wireless vehicle network (including, but not limited to, a CAN bus) to communicate signals representing data to and from the VCS (or components thereof). The VCS may also be connected to displays or HMI's associated with the passenger's or passengers' destination or departure location. Alternatively, or in combination, a passenger's or passengers' destination or departure location may be controlled by a passenger in the vehicle using a personal nomadic device or mounted HMI after boarding.

System inputs may include, but are not limited to, a weather data server 199 that provides weather data, residential devices 208, one or more residential EV chargers 210, one or more commercial EV chargers 212, and a server for a utility provider 214. The weather data server 199 may be provided or sustained by an organization like the national weather service or other suitable organization. The weather data server 199 may provide information that includes but is not limited to weather history, current and forecasted windspeeds, current and future rain fall, current and future temperature, current and future barometric pressure, presence of extreme weather (e.g., heat wave, tornados, hurricanes, blizzard, wild fires, and torrential rain fall), and the forecasted regions associated with the various weather conditions 224. The information or weather data provided by the weather data server 199 may communicate 155 with a cellular tower 162 or a similar tower or antenna may function as a Wi-Fi access point. The weather data server 199 may communicate 155 with a network 158 or cloud that is connected to a remote cloud server 166.

Additionally, emergency information or emergency data 233 may be one of the inputs provided. The emergency data may be provided by a government run entity, such as the Emergency Alert System (EAS) approved by the Federal Communications Commission. The EAS or similar system may provide national alerts from a head of state (e.g., President) and local weather emergencies such as tornadoes and flash floods (and in some cases severe thunderstorms depending on the severity of the storm).

Residential devices 208 may include internet of things (IOT), e.g., computing devices embedded in everyday objects, enabling them to send and receive data. The residential devices 208 may communicate 201 electrical grid quality data 236 to the network 158, or the remote cloud server 166, or both. The electrical grid quality data 236 may include continuity of service (e.g., voltage drops or overages below or above a threshold level causing blackouts or brownouts), variation in voltage magnitude (e.g., variations in the peak or RMS voltage, spikes, under/over voltages, etc.), transient voltages and currents, harmonic content in the waveforms for alternating current (AC) power. When aggregated the electrical grid quality data 236 may be provided over a geographic location or region. The electrical grid quality data 236 from the residential devices 208 may also provide a more localized or accurate data set so an individual residence or location can be identified. One or more residential chargers 210 and one more commercial charger 212 may communicate 202 data to the network 158 and the central cloud server 166. More specifically, the chargers may communicate their geographic location over a vehicle to vehicle or vehicle to infrastructure (V2X) network. Like the residential devices 208, the data may include electrical grid quality data 236 as described above.

The electric grid quality data 236 may also be provided by one or more servers operated by a utility service provider 214. The utility service provider's server 214 may communicate 204 with the network 158 and the cloud server 166.

In addition to the electric grid quality data 236 already mentioned, the server 214 may provide data that includes but is not limited to load forecasting data 238 associated with one or more geographic regions, quality of the physical infrastructure 240 associated with the same, and an estimated outage time or power restoration window 242. The term "load forecasting data" generally refers to a predicted quantity of electric power (load) required at a given time for a given region. This may be based on historical data (e.g., how much power was required before at a given date) or a more sophisticated method (e.g., linear regression of several factors, gradient boosted trees, etc.) may be used. The term "quality of the physical infrastructure" is used to generally refer to the robustness of the infrastructure. If certain regions of an electric grid have low-hanging power lines or tree limbs near or entangled with the power lines, then the quality of that region may be less than that of another region whose power lines are buried and not susceptible to interference with trees. The quality of the physical infrastructure may also refer to the age of certain sections or regions of the electric grid.

Figure 2:
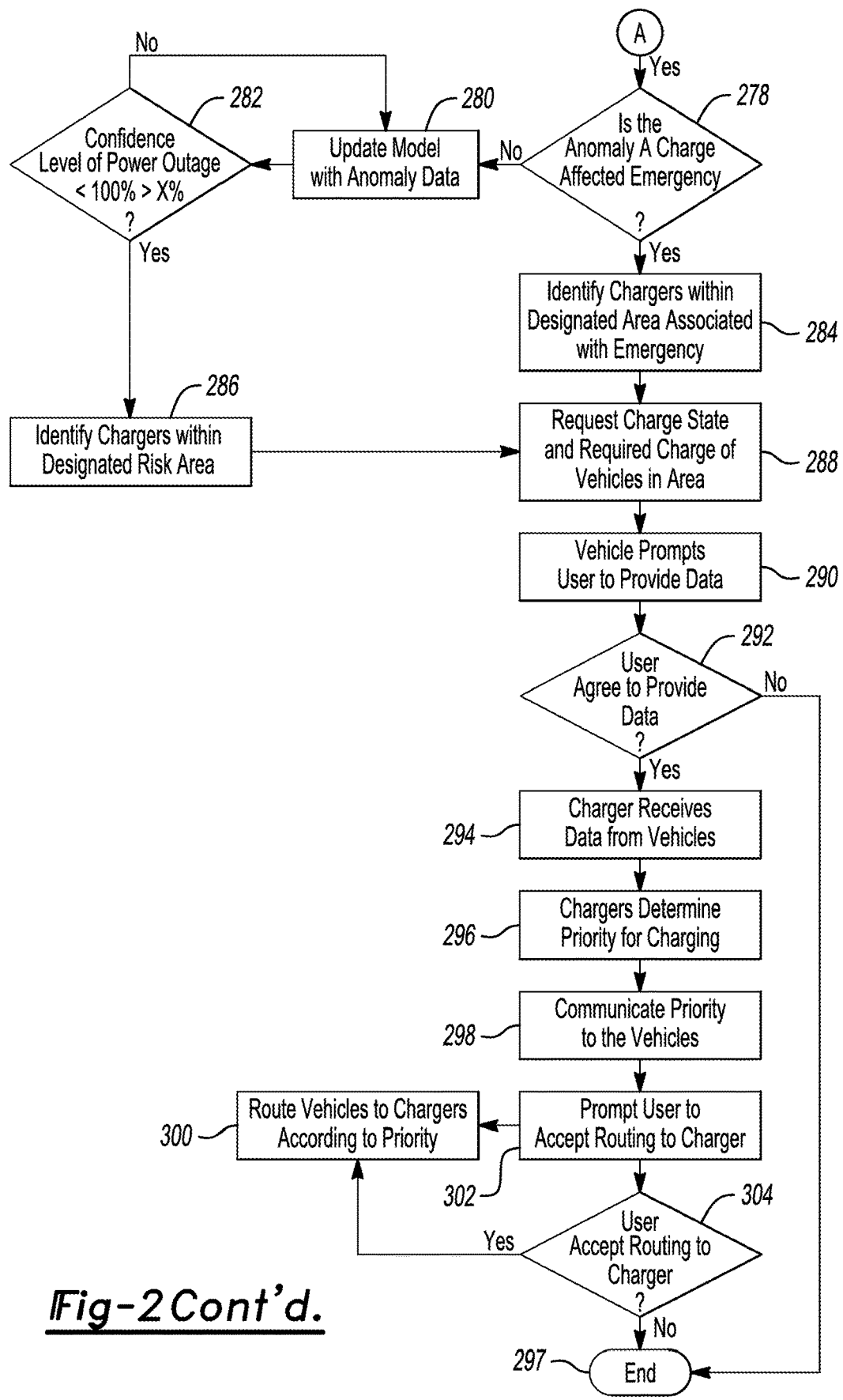
FIG. 2 is a flowchart illustrating a process or method of operating the vehicle network.
Figure 4A:
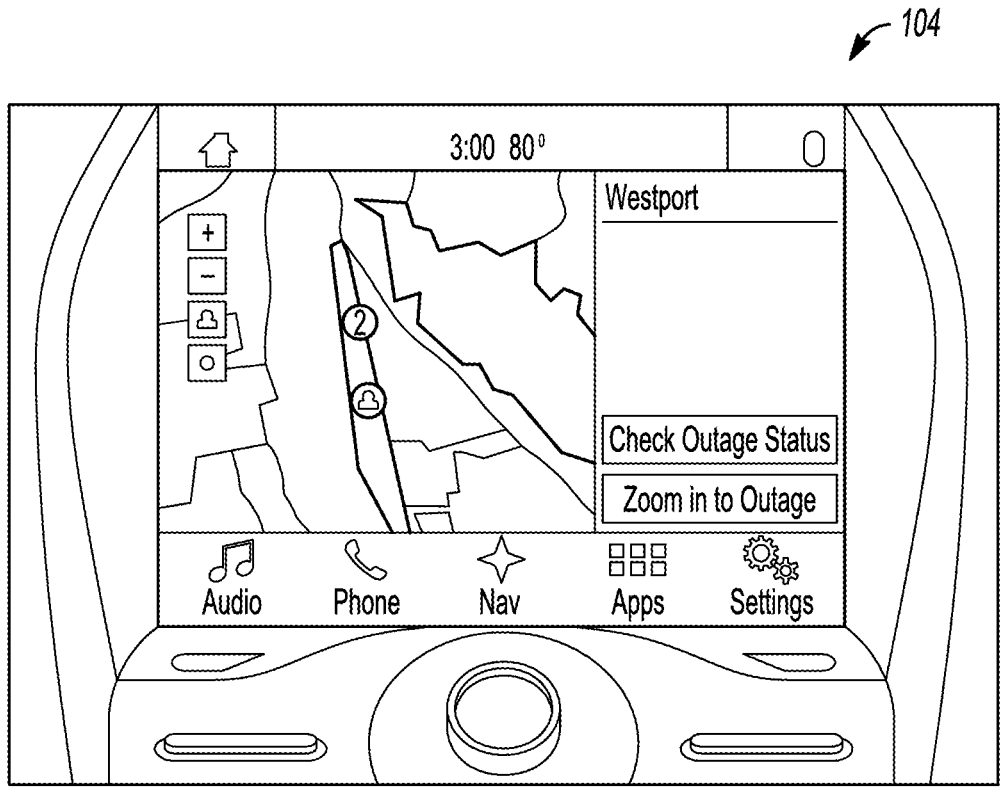
FIGS. 4A-4C are illustrations of a vehicle display according to one or more embodiments.
Figure 4B:
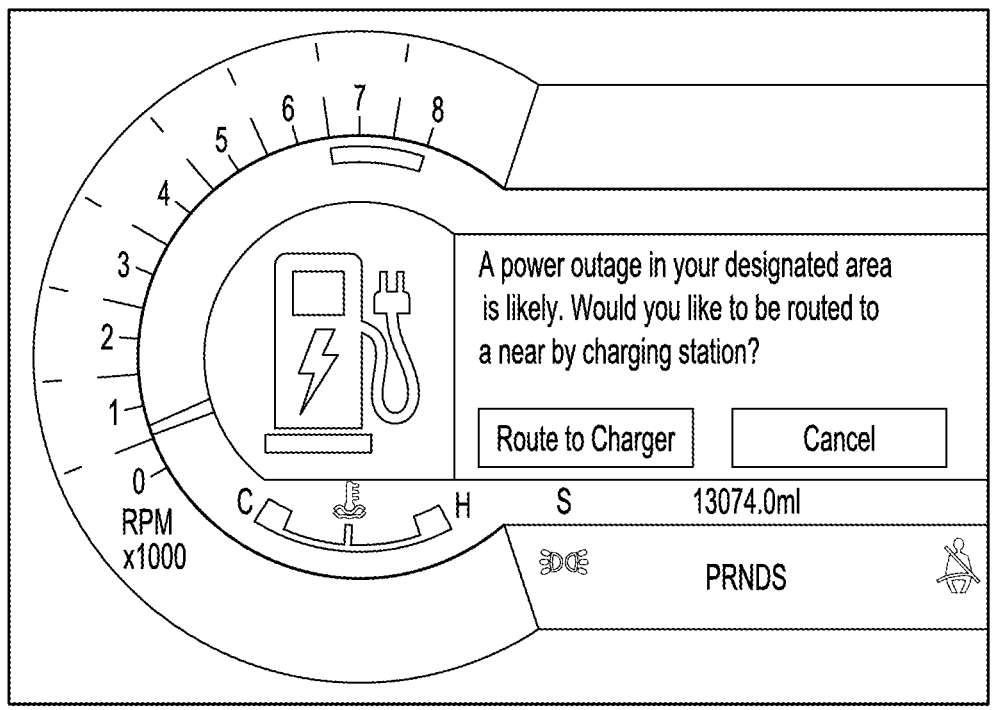
Figure 4C:
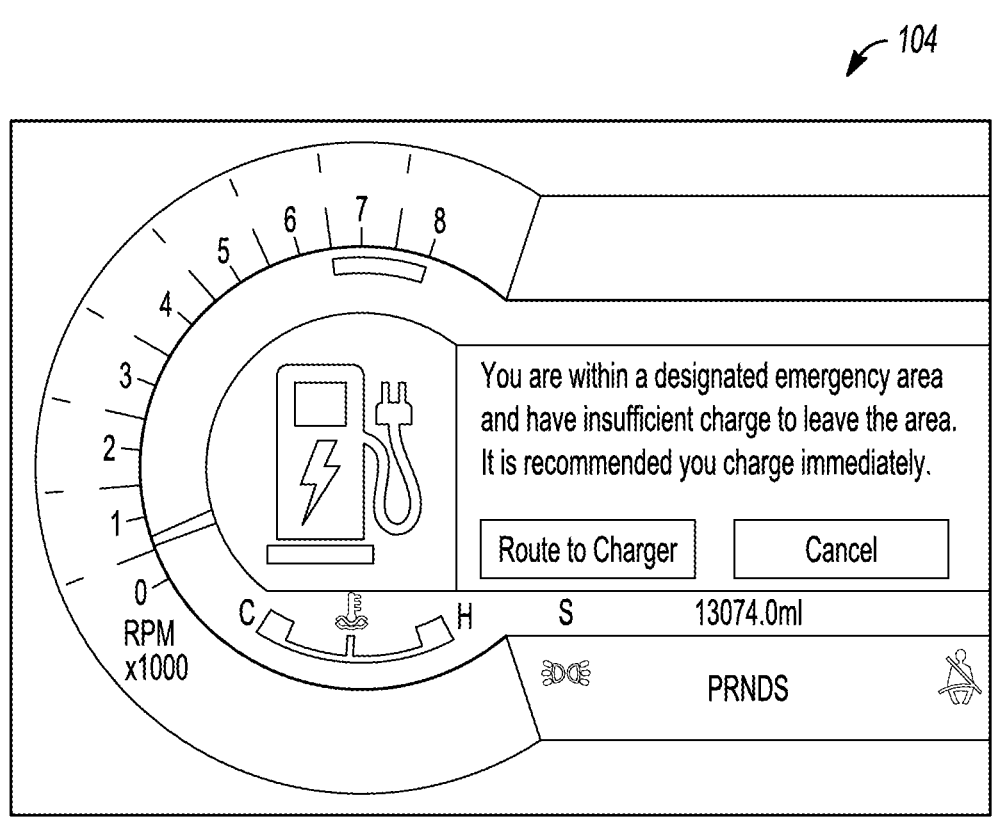

System outputs may include, but are not limited to, a visual display 104 and speakers 130 or other stereo system output. In various embodiments, a visual display 104 may be used to display a map of the geographic region or area, warnings or alerts regarding charging or routing information to the vehicle's operator. Speakers 130 are connected to an amplifier 132 and receive signals from processor 106 through a digital-to-analog converter 134. Input and output signals may also be communicated via a remote BLUETOOTH device such as a personal navigation device (PND) 136, or a USB device, such as vehicle navigation device 138, along the bi-directional data streams generally represented at 140 and 120. System outputs may also include vehicle data 244 associated with the range of the vehicle at a given time and location. This may include but is not limited to the current state of charge (SOC) 246 of the vehicle's battery, charging status 247 e.g. whether the vehicle currently plugged in and receiving or not receiving a charge, route history and driving mileage history 248, planned route, and estimated charge required to complete the planned route (FIG. 2).

In one illustrative embodiment, system 100 uses a BLUETOOTH transceiver 150 to wirelessly communicate 152 with one or more personal mobile or nomadic devices 154 (e.g., cell phone, smart phone, PDA, smart watch or any other device having wireless remote network connectivity). Nomadic device 154 can then be used to communicate 156 with a network 158 outside vehicle 102 through, for example, communication 160 with the satellite or cellular tower 162. Moreover, the remote cloud server 166 may convey power outage information, likelihood of a power outage, route information to nearest charging station, for example.

Nomadic device 154 may also be paired to vehicle 102 and communicate via BLUETOOTH or similar technology as represented by signal 164. Pairing of nomadic device 154 and BLUETOOTH transceiver 150 may be initiated by an associated button or interface 124, or similar input. Accordingly, CPU 106 pairs an onboard BLUETOOTH transceiver 152 with a BLUETOOTH transceiver in nomadic device 154.

Data may be communicated between CPU 106 and network 158 utilizing, for example, a data plan, data over voice, or DTMF tones associated with nomadic device 154. Alternatively, it may be desirable to include an onboard modem 170 having antenna 172 for communication 174 of data between CPU 106 and network 158 over the voice band. Nomadic device 154 may then be used for communication 156 with network 158 outside vehicle 102 through, for example, communication 160 with cellular tower 162. In some embodiments, modem 172 may establish communication 180 with tower 162 to communicate with network 158. As one example, modem 172 may be a USB cellular modem and communication 180 may be cellular communication.

In one illustrative embodiment, processor 106 is provided with an operating system including an API to communicate with modem application software. The modem application software may access an embedded module or firmware of BLUETOOTH transceiver 152 to complete wireless communication with a remote BLUETOOTH transceiver, such as that found in nomadic device 154, for example. BLUETOOTH is a subset of IEEE 802 PAN (personal area network) protocols. IEEE 802 LAN (local area network) protocols include Wi-Fi and have considerable cross functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like.

In another embodiment, nomadic device 154 includes a modem for voice band or broadband data communication. In the data-over-voice embodiment, frequency division multiplexing may be implemented allowing the owner of the nomadic device to talk over the device while data is being transferred. At other times, when the owner is not using the device, the data transfer can use the entire available bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbps for stationary or walking users and 385 kbps for users in a moving vehicle. 3G standards are now being replaced by IMT-Advanced (4G) which offers 100 Mbps for users in a vehicle and 1 Gbps for stationary users. In another embodiment, nomadic device 154 is replaced with a cellular communication device (not shown) that is installed in vehicle 102. In other embodiments, nomadic device 154 may be implemented by a wireless local area network (LAN) device capable of communication over, for example (and without limitation), an 802.11g network (i.e., Wi-Fi, V2I, V2X) or a WIMAX network, for example.

In one embodiment, incoming data can be passed through nomadic device 154 through onboard BLUETOOTH transceiver 150 to processor 106. In the case of certain temporary data, for example, the data can be stored on HDD 110 or mobile device or other storage media until such time as the data is no longer needed. Temporary data may include various sensor data collected for a particular user, trip, route, etc., that may be communicated to one or more cloud-based services for use in identifying locations of EV chargers, current traffic conditions at one or more commanded destinations, predetermined periods or linger times, frequently traveled routes, destinations, pick-up locations, etc., associated with efficiently locating and traveling to a charging station. The temporary data may then be deleted or overwritten after communication to other computers within the network.

As previously described, various devices may interface with VCS 100, such as personal navigation device 136, having a USB connection 182 and/or an antenna 184, vehicle navigation device 138 having a USB connection 186 or other connection, onboard GPS device 122, or remote navigation system (not shown) having connectivity to network 158. As used herein, USB generally represents any of a variety of serial networking protocols that may include IEEE 1394 protocols referred to as FIREWIRE™ (Apple), i.LINK™ (Sony), and LYNX™ (Texas Instruments), EIA (Electronics Industry Association) serial protocols, IEEE 1284 (Centronics Port), S/PDIF (Sony/Philips Digital Interconnect Format) and USB-IF (USB Implementers Forum), which form the backbone of the device-device serial standards. Most of the protocols can be implemented for either electrical or optical communication.

As also shown in FIG. 1, processor 106 may communicate with various other types of auxiliary devices 190. These devices may be connected through a wireless connection/antenna 192 and/or a wired connection 194. Auxiliary devices 190 may include, but are not limited to, personal media players, wireless health devices, portable computers, and the like. Processor 106 may also be connected to a vehicle based wireless router 196, using for example a Wi-Fi (IEEE 803.11) transceiver 198. This could allow processor 106 to connect to remote networks in range of vehicle based wireless router 196.

As previously described, system 100 may include a wireless transceiver, such as BLUETOOTH transceiver 152, modem 170, or router 196, for example, in communication with vehicle processor 106, which may be further programmed to obtain information including power outage information, likelihood of a power outage, route information to nearest charging station, flood advisories, and flood warnings, for example.

Referring to FIG. 2, a flowchart illustrating operation of a system or method 22 of the vehicle based computing system 100 is illustrated. Various functions or processes illustrated may be performed in a different order, may be omitted, or may be repeatedly performed although not explicitly illustrated or described to accomplish various features and advantages described herein as those of ordinary skill in the art will understand.

As previously mentioned, the network 158, remote cloud server 166, or processor 106, or all three may receive a number of different inputs. The inputs are categorized into three main groups; external data 22, utility data 234, and vehicle data 244.

The external data group 222 may include historical weather or historical climate data 224, such monthly or yearly weather patterns. The external data group may also provide real-time weather data 226 and satellite imagery 228 that includes current and forecasted windspeeds, current and future rain fall, current and future temperature, current and future barometric pressure, presence of extreme weather (e.g., heat wave, tornados, hurricanes, blizzard, and torrential rain fall), and the forecasted regions associated with the various weather conditions. The aforementioned data is used in a machine learning or fuzzy logic system 260 where it is aggregated. GPS data 230 that may include but is not limited to vehicle location, charging locations, and traffic conditions is also included in the external data group 224. This data may be provided to a geographic information system (GIS). Additionally, flood map data 232, data that indicates flood prone areas (e.g. flood zones), water table levels, tide charts, and water levels for streams, rivers, lakes, oceans and tributaries, may also be provided the GIS 262. The GIS 262 may also receive the aggregated data from the fuzzy logic system 260

As previously mentioned, the external data group may include emergency data 233 including but not limited to national or local emergency alerts. The processor 106 may regularly receive and monitor the emergency data 233, as represented by operation 270.

The information received from the fuzzy logic system 260 and the GIS 262 may then be used to derive a predictive risk map, as represented by operation 264. The predictive risk map may identify certain geographic regions that are at risk of encountering the severe weather conditions or power loss as previously outline. The predictive risk map information may be received and monitored by the processor, as represented by operation 272.

The utility data group 234 may include electric quality data 236 received from a plurality of residential devices or IOT devices 208, as previously described above. The utility data group 234 may also include load forecasting data 238, infrastructure quality 240, electric vehicle charging data 241, and estimated outage time 242. The data may be compiled and analyzed to once it is received, as represented by operation 266. A real-time outage map may then be generated as represented by operation 268. The real-time outage map may be received and monitored by the processor 106 of the vehicle 102 or an external data processor 302 (FIG. 3), as represented by operation 274. An electrical input measurement device 304 of the charger 210/212 may also detect and provide outage information or electric grid quality data, associated with its electrical connection to a portion of the grid, to the cloud 158 or server 166. For example, if the device 304 detects a transient voltage or a loss of power, it may send that information to the central server so that it is included in the real-time outage mapping operation 268.

Operations 270, 272, and 274 are monitored and if an anomaly is detected the controller branches to operation 278, as represented by operation 276. An anomaly may include but is not limited to an emergency affecting charging of vehicles (e.g., severe weather, flooding, mud slides, fire, etc.). The anomaly may further include loss of power within the electric grid or a decrease in electric quality as indicated by the electric quality data. As mentioned the electric quality data may include voltage drops or overages below or above a threshold level causing blackouts or brownouts), variation in voltage magnitude (e.g., variations in the peak or RMS voltage, spikes, under/over voltages, etc.), transient voltages and currents, harmonic content in the waveforms for alternating current (AC) power. If the anomaly detected is identified as an emergency, a transceiver 306 of the charger 210/212 identifies chargers within the designated area associated with the emergency, as represented by operation 284.

After an anomaly is detected and the anomaly is not designated as a charge affecting emergency, the logic model used by a general purpose computer within the charger 210/212 may be updated with the anomaly data, as represented by operation 280. The computer of the charger 210/212 may be programmed to calculate a confidence level of a power outage based at least in part on the anomaly detected, as represented by operation 282. The confidence level may then be compared to a predetermined threshold X. The predetermined threshold X may be expressed in a percentage form, such as there is a 60% chance of a power outage. Alternatively, the predetermined threshold may be expressed as a numerical value. If the calculated confidence level falls between the predetermined threshold X and the upper threshold (e.g., 100%) the computer of the charger 210/212 identifies other chargers 210/212 within the designated risk area as determined by the predictive risk map 264, as represented by operation 286.

The chargers 210/212 identified in operation 284 and operation 286 may then request the charge state or state of charge of vehicles 102 within the designated risk area or emergency data, as represented by operation 288. In addition, vehicles that are likely to be within the designated area based on their respective travel histories or planned trips may be identified. The processor 106 of the vehicle may then prompt a user by displaying a question or statement on the vehicle's 102 display 104, to provide the data, as represented by operation 290. The user may then agree or disagree to provide the data to the charger, as represented by operation 292. Note, the user may be a driver or passenger within the vehicle or if the vehicle is an autonomous vehicle, the user may be an individual controlling one or more of the vehicles (e.g., fleet manager). Moreover, if the vehicle is driven, the user or passenger may have already agreed to provide the data requested at a previous time (e.g., when the user purchased or leased the vehicle or when agreeing to the terms and conditions associated with a software update). Alternatively, the manufacturer of the vehicle may approve the request on behalf of the user or customer. If the request is denied, the process ends. If request is approved, the chargers then receives the requested data from the vehicles, as represented by operation 294. The data provided includes the vehicle data 244 as described above.

As previously mentioned, the processor 106 may communicate various data associated with the vehicle. For example, the real-time location 252, the state of charge and associated predicted range of the vehicle 246, charging status 247, drive mileage history 248, and the planned route all may be communicated from the processor 106 to the network and the remote cloud server. Alternatively, this data may be provided to the transceiver 306 and computer of one or more of the chargers 210/212. The vehicle data may then be used to identify vehicles within the predictive risk map or those vehicles that are not within the predictive risk map but are likely to be within a given time window. For those vehicles that are not within the predictive risk map, the real-time location 252, planned route 250, or drive history 248 (e.g., if the vehicle has a history of traveling within the identified region at given time and day) is cross-referenced with the predictive risk map, as represented by operation 264.

FIG. 3 illustrates an example block topology for a charger-based computing system 300. The system may include one or more residential chargers 210 or commercial chargers 212, or a combination thereof. The system 300 includes the weather data server 199, the utility provider server 214, and server 166 that communicates 204 with the network or cloud 158. The cloud or network 158 may communicate with one or more chargers 210/212.

Each of the chargers may include a general-purpose computer, controller, or processor, such as an external data processor 302. The external data processor 302 may be programmed to execute the monitoring operations specified in operations 270, 272, and 274. While executing the monitoring operations, the processor 302 may be further programmed to detect an anomaly as described in operation 276.

The chargers 210/212 may also include an electrical measuring device 304 that is configured to monitor characteristics of the electrical input received by the charger 210/212. The electrical input may be the electricity that powers the charger 210/212. Alternatively, the electrical input could be electricity that does not power the charger 210/212, if the charger is powered by another means (e.g., solar, battery, wind power).

The chargers 210/212 may also include one or more transceivers 306 that communicate with one or more vehicles 102 and with other transceivers contained in the other chargers 210/212. The transceivers may include a general-purpose computer capable of receiving data provided from the external data processor 302 and the electrical input measurement device 304. The computer within the transceiver 306 may also be programmed to execute operations 284-300 described with reference to FIG. 2A. Each of the vehicles 102 may be configured to execute operations 302 and 304 described with reference to FIG. 2A.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A network of operating Internet-of-Things (IOT) devices electrically connected to a utility grid, in communication with a vehicle, and located at a base location for the vehicle and a plurality of electric vehicle chargers each having a controller comprising: by at least one controller,
receiving data indicating a threshold risk of utility grid power loss in a first defined geographic area; responsive to receiving the data indicating a risk above the threshold risk of utility grid power loss from the IOT device via the vehicle, broadcasting commands summoning vehicles from a second defined geographic area to travel to and charge via the network responsive to the data indicating the threshold risk of utility grid power loss in the first defined geographic area, wherein the threshold risk is at least partially based on infrastructure age data received from infrastructure disposed within the first defined geographic area, and prioritizing charging of the vehicles at the network according to charge state data such that the vehicles having lowest state of charge are charged first, wherein the controller is further configured to broadcast commands to change operation modes of the vehicles to increase drive ranges of the vehicles in the second defined geographic area.

2. The network of claim 1, wherein the controller is further configured to prioritize charging of the vehicles according to the charge state data such that the vehicles having lowest state of charge are charged fastest.

3. The network of claim 1, wherein the controller is further configured to prioritize charging of the vehicles according to a predicted charge range such that vehicles having lowest charge range are charged fastest.

4. The network of claim 1, wherein the threshold risk is based on a change in monitored voltage.

5. The network of claim 1, wherein the threshold risk is based on electric load data.

6. The network of claim 1, wherein the threshold risk is based on weather data.

7. The network of claim 1, wherein the controller is further configured to broadcast charge schedule data to at least one other controller associated with the network.

8. A method of operating a network of electric vehicle chargers comprising:
by a controller,
broadcasting commands summoning vehicles in a defined geographic area to travel to and charge via the network responsive to data indicating a threshold risk of utility grid power loss in the defined geographic area, wherein the threshold risk is at least partially based on infrastructure age data received from infrastructure disposed within the defined geographic area, and
prioritizing charging of the vehicles at the network according to charge state data such that the vehicles having lowest state of charge are charged first.

9. The method of claim 8, further comprising:
receiving the data indicating a threshold risk of utility grid power loss in the defined geographic area.

10. A method of operating an Internet-of-Things (IOT) device electrically connected to a utility grid, in communication with a vehicle, and located at a base location for the vehicle and a plurality of electric vehicle chargers each having a controller comprising: by at least one controller, receiving data indicating a threshold risk of utility grid power loss in a first defined geographic area; responsive to receiving the data indicating a risk above the threshold risk of utility grid power loss from the IOT device via the vehicle, broadcasting commands summoning vehicles from a second defined geographic area to travel to and charge via the network responsive to the data indicating the threshold risk of utility grid power loss in the first defined geographic area, wherein the threshold risk is at least partially based on infrastructure age data received from infrastructure disposed within the first defined geographic area, and prioritizing charging of the vehicles at the network according to charge state data such that the vehicles having lowest state of charge are charged first, wherein the controller is further configured to broadcast commands to change operation modes of the vehicles to increase drive ranges of the vehicles in the second defined geographic area.

11. The method of claim 8, further comprising:
receiving charge credentials associated with at least one of the vehicles such that vehicles having the charge credentials are charged first.

12. The method of claim 8, wherein the broadcasting includes summoning a first group of vehicles having a required charge duration that falls below a first-charge-duration threshold.

13. A vehicle charge network comprising: an Internet-of-Things (IOT) device electrically connected to a utility grid, in communication with a vehicle, and located at a base location for the vehicle and a plurality of electric vehicle chargers each having a controller comprising: by at least one controller, receiving data indicating a utility grid power loss in a first defined geographic area; responsive to receiving the data indicating a grid power loss from the IOT device, broadcasting commands summoning vehicles from a second defined geographic area to travel to and charge via the network responsive to the data indicating the utility grid power loss in the first defined geographic area, and prioritizing charging of the vehicles at the network according to charge state data such that the vehicles having lowest state of charge are charged first, wherein the controller is further configured to broadcast commands to change operation modes of the vehicles to increase drive ranges of the vehicles in the second defined geographic area.

14. The network of claim 13, wherein the data indicating power loss is based on a change in voltage monitored by the IOT device.

15. The network of claim 13, wherein the controller is further configured to summon a plurality of electric vehicles within a defined geographic area to travel to and charge via the network, and prioritize charging of the vehicles at the network according to charge state data such that the vehicles having lowest state of charge are charged first.

16. The network of claim 15, wherein the controller is further configured to broadcast charge schedule data to at least one other controller associated with the network.

* * * * *